(12) United States Patent
Douhet et al.

(10) Patent No.: US 8,094,845 B2
(45) Date of Patent: Jan. 10, 2012

(54) MOBILE TERMINAL WITH AT LEAST TWO TRANSDUCERS

(75) Inventors: Gerard Douhet, Fegersheim (FR); Stephane Dufosse, Cormeilles en Parisis (FR); Alain Guillotin, Rueil-Malmaison (FR)

(73) Assignee: Imerj, Ltd., Ugland House, Grand Cayman (KY)

( * ) Notice: Subject to any disclaimer, the term of this patent is extended or adjusted under 35 U.S.C. 154(b) by 1116 days.

(21) Appl. No.: 11/336,605

(22) Filed: Jan. 19, 2006

(65) Prior Publication Data
US 2006/0183508 A1 Aug. 17, 2006

(30) Foreign Application Priority Data

Feb. 3, 2005 (EP) .................................. 05 300 088

(51) Int. Cl.
*H04R 5/02* (2006.01)
*H04R 25/00* (2006.01)
*H04M 1/00* (2006.01)

(52) U.S. Cl. ...... 381/303; 381/306; 381/374; 455/575.1
(58) Field of Classification Search .................. 381/182, 381/374, 375, 303, 306; 455/149, 575.1
See application file for complete search history.

(56) References Cited

U.S. PATENT DOCUMENTS

| 5,970,153 | A  | * | 10/1999 | Petroff | 381/17 |
| 2001/0006336 | A1 | * | 7/2001 | Yi et al. | 320/115 |
| 2002/0042287 | A1 |  | 4/2002 | Asami | |
| 2003/0021428 | A1 | * | 1/2003 | Abe et al. | 381/97 |
| 2004/0204194 | A1 | * | 10/2004 | Akai et al. | 455/575.1 |
| 2006/0115090 | A1 | * | 6/2006 | Kirkeby | 381/17 |

OTHER PUBLICATIONS

French Search Report—Jun. 22, 2005 for EP 05 300 088.
First Chinese Office Action dated Jun. 25, 2010.
Second Chinese Office Action dated May 24, 2011 (this is the first Chinese Office Action that we have have received since we took over prosecution for this matter).

* cited by examiner

*Primary Examiner* — Curtis Kuntz
*Assistant Examiner* — Jesse Elbin
(74) *Attorney, Agent, or Firm* — Fischmann & Breyfogle LLP

(57) ABSTRACT

The invention concerns a mobile terminal with at least two transducers (LSm, LSs1, LSS2) used simultaneously as loudspeakers for stereophonic effect. According to the invention, one of said transducers is a main transducer (LSm) with a main working frequency band (Bm) corresponding to at least the phone frequency band, while the other transducer is a secondary transducer (LSs1; LSs2) with a secondary working frequency band (Bs1; Bs2) band different from said main frequency band, the lowest frequencies of said secondary working frequency band (Bs1; Bs2) being greater than the lowest frequencies of said main working frequency band.

19 Claims, 2 Drawing Sheets

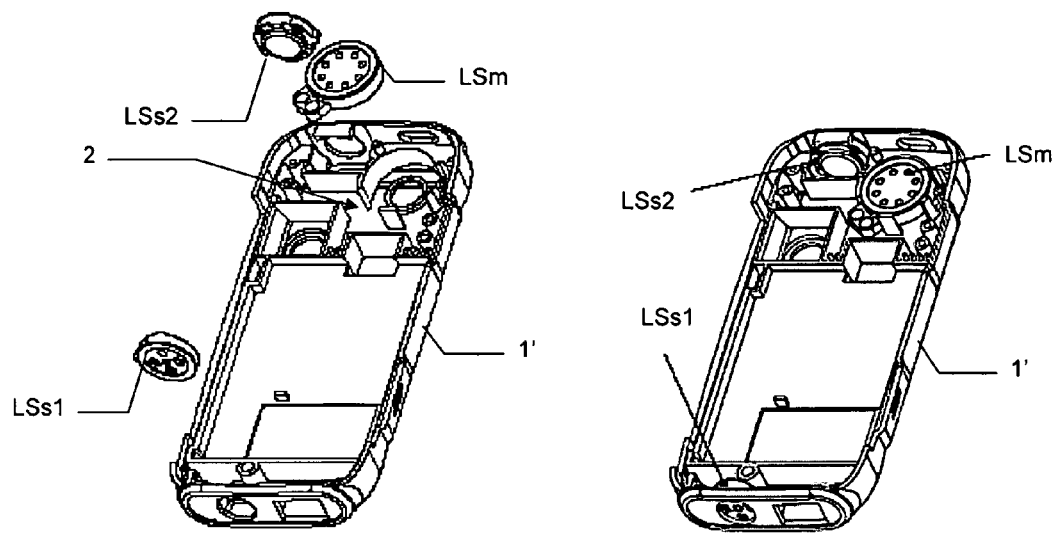
FIG. 5a  FIG. 5b
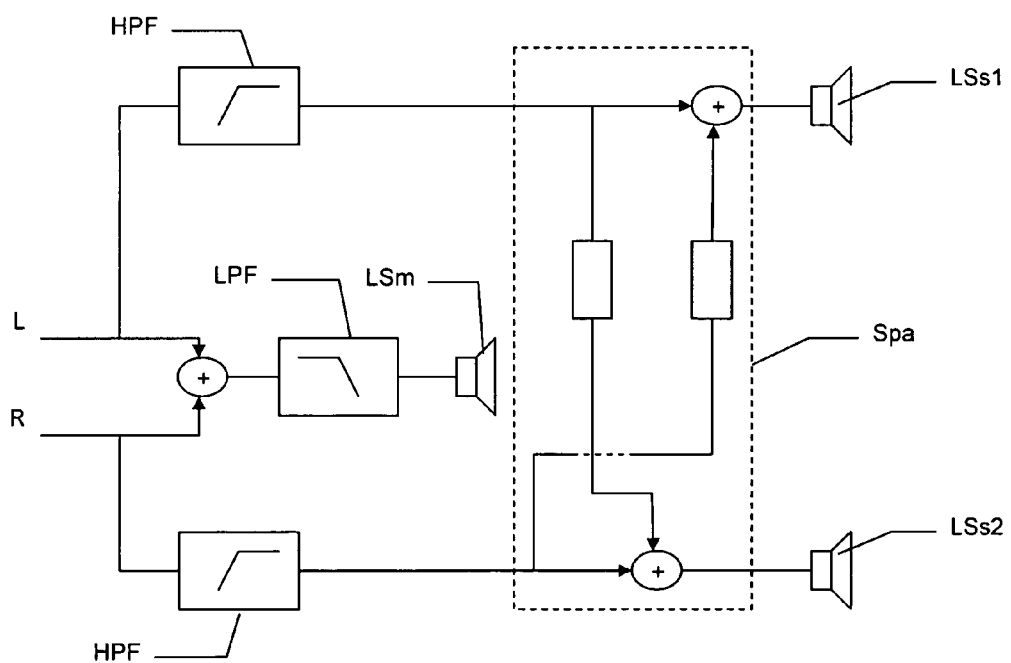
FIG. 6

MOBILE TERMINAL WITH AT LEAST TWO TRANSDUCERS

RELATED APPLICATION

This application is related to and claims the benefit of priority from European Patent Application No. 05 300 088.1, filed on Feb. 3, 2005, the entirety of which is incorporated herein by reference.

FIELD OF THE INVENTION

The present invention concerns a mobile terminal provided with several (at least two) transducers used as loudspeakers for stereophonic effect. More generally, the invention relates to all mobile apparatus provided with functionalities to play sound signal (voice signals or melodies), such as mobile phones, or Personal Digital Assistants, or audio recorders.

BACKGROUND

All existing mobile telephones include a transducer used as an earphone for listening to the voice of a caller. Some mobile phone are also provided with a transducer used as a loudspeaker for hand-free communication. This transducer is generally the same than the one used as earphone. In both cases, usual transducer works in a standardized phone frequency band which corresponds to the audio bandwidth of the voice signal, i.e. between 300 Hz and 3400 Hz, or between 100 Hz and 8000 Hz for wide band telephony More recently, mobile phones used for playing melodies (either ringing melodies but also all kind of sound signals) have been proposed. In some cases, the same transducer is used as earphone, hand-free loudspeaker, and melody player. However, the useful frequency bandwidth of music is between 20 Hz and 20 KHz, which includes the above-mentioned standardized phone frequency band, but is much greater towards both the low frequencies and the high frequencies. As a consequence, specific transducers have been developed in order to obtain a good sound for music with only one transducer. Generally, these specific transducers have an important size in order to be able to restitute a good sound, especially for the low frequencies.

Now, in order to obtain a stereo effect, it is necessary to provide the mobile terminal with at least two transducers used as loudspeakers. It is already known to provide a mobile phone with two identical transducers used as loudspeakers for stereophonic effect, with the same working frequency band. However, a compromise has to be made between, on the one hand, the wish to have a good stereo effect, even for music, and, on the other hand, the bulk constraint. This is especially true in the domain of the mobile phones wherein the tendency is to miniaturize as much as possible the total size of the phone while keeping some important features such as a large screen and a keypad.

Consequently, known mobile phones do not enable to obtain a good stereophonic effect for all kind of sound signals, especially for music.

OBJECTS AND SUMMARY

The aim of the invention is to remedy the above drawback by proposing a solution enabling a very good stereophonic effect with a small size apparatus.

To this aim, an object of the present invention is to provide a mobile terminal with at least two transducers used simultaneously as loudspeakers for stereophonic effect, characterized in that one of said transducers is a main transducer with a main working frequency band corresponding to at least the phone frequency band, while the other transducer is a secondary transducer with a secondary working frequency band different from said main frequency band, the Lowest frequencies of said secondary working frequency band being greater than the lowest frequencies of said main working frequency band.

In a first embodiment of the invention, said mobile terminal comprises only said main transducer and a single secondary transducer, and said main working frequency band includes said secondary working frequency band.

In a second embodiment of the invention said mobile terminal comprises said main transducer and at least two secondary transducers with substantially identical secondary working bands, and the highest frequencies of said main working frequency band correspond to the lowest frequencies of said secondary working frequency band.

BRIEF DESCRIPTION OF THE DRAWINGS

Other features and advantages of the invention become apparent from the following description of two embodiments of the invention given by way of non-limiting examples only and with reference to the accompanying drawings, in which:

FIG. 5a and FIG. 5b a half-part of a housing provided with three transducers according to the second embodiment of the invention;

FIG. 6 shows a synoptic explaining a possible signal processing for the second embodiment.

DETAILED DESCRIPTION

Figure 1:
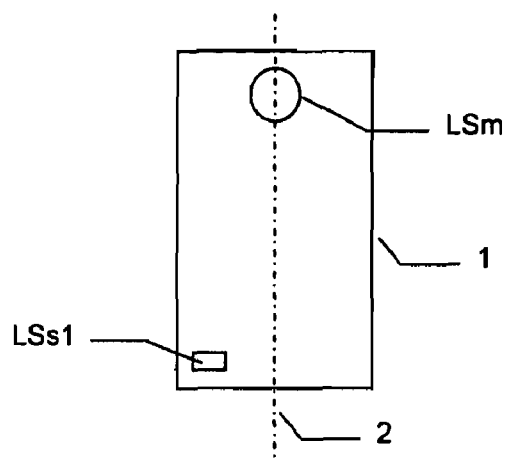
FIG. 1 shows schematically a first embodiment in accordance with the invention.
Figure 2:
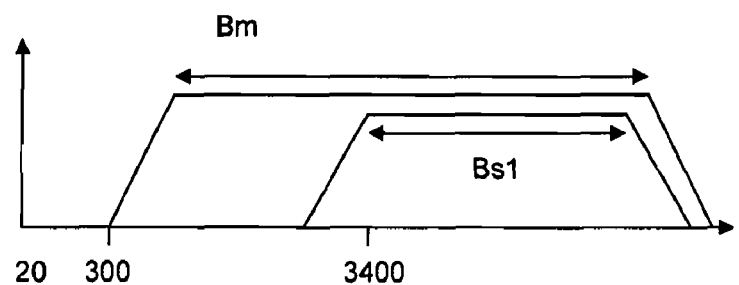
FIG. 2 shows the relative positions of the working frequencies bands for the transducers of the first embodiment.

In relation with FIG. 1, which represents a first possible embodiment according to the invention, a mobile terminal, for instance a mobile phone, is provided with two transducers used simultaneously as loudspeakers for stereophonic effect. One of the transducers, called in the following "main transducer" LSm, is chosen in order that its working frequency band Bm includes the phone frequency band, which is a standardized band between for instance 300 Hz and 3400 Hz. In the example of FIG. 2, the lowest frequencies of main working band Bm correspond substantially to the lowest frequencies of the phone frequency band. However, the lowest frequencies may also be less than the lowest frequencies of the phone frequency band. The other transducer, called in the following "secondary transducer" LSs1, is chosen in order that its working frequency band Bs1 is located in the upper part of the frequency spectrum. More precisely, as can be seen in FIG. 2, the lowest frequencies of secondary working band Bs1 are greater than the lowest frequencies of said main working frequency band Bm. In order to obtain the stereophonic effect with only the two preceding transducers, main working frequency band Bm also includes the secondary working frequency band Bs1.

Tests made by the Applicant with the above embodiment give good results for stereophonic effects, not only for the voice signal, but also for music, since secondary frequency band Bs1 is chosen at the upper part of the frequency spectrum, with higher frequencies which can go up to 20 KHz.

In addition, it is not necessary to enlarge the size of the secondary transducer since its working frequency band is at high frequencies.

In order to reinforce the stereophonic effect, main transducer LSm and secondary transducer LSs1 are preferably located as far as possible from each other. As best shown in FIG. 1, the mobile terminal comprises a housing 1 of parallelepiped general form extending along a longitudinal axis 2. It is thus possible to put main transducer LSm and secondary transducer LSs1 inside said housing 1 as far as possible from each other along the direction of said longitudinal axis 2. In this case, the user will get a maximum stereophonic effect by putting the mobile terminal down on a plane surface so that longitudinal axis 2 is parallel to the plane surface.

Since main frequency band includes at least the phone frequency band, main transducer LPm can also be used for other classical functions of a phone handset, especially as an earphone and/or an hand-free loudspeaker.

Figure 3:
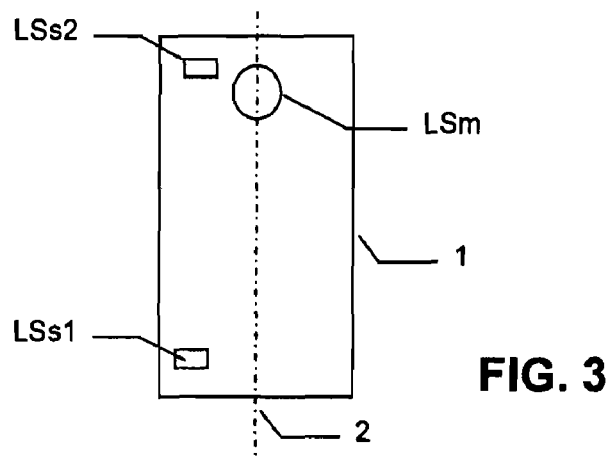
FIG. 3 shows schematically a second embodiment in accordance with the invention.
Figure 4:
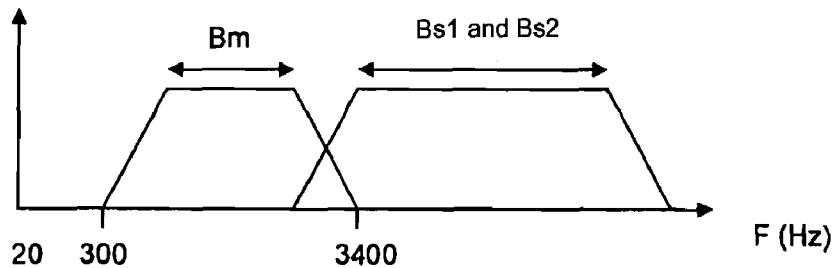
FIG. 4 shows the relative positions of the working frequencies bands for the transducers of the second embodiment.

FIGS. 3 and 4 show a second embodiment according to the invention wherein the mobile terminal is provided with a main transducer LSm and two secondary transducers LSs1, LSs2, with substantially identical secondary working bands Bs1, Bs2. As in the previous first embodiment, the lowest frequencies of main working band Bm may correspond substantially to the lowest frequencies of the phone frequency band, and secondary working frequency bands Bs1 and Bs2 are located in the upper part of the frequency spectrum, so that the lowest frequencies of secondary working bands Bs1 and Bs2 are greater than the lowest frequencies of said main working frequency band Bm. However, since the stereophonic effect is mainly due to secondary transducers, it is not necessary in this embodiment that main band Bm includes also secondary bands Bs1 and Bs2. In a different manner, as can be seen in FIG. 4, the highest frequencies of said main working frequency band correspond to the lowest frequencies of said secondary working frequency bands.

In order to reinforce the stereophonic effect, secondary transducers LSs1 and LSs2 are preferably located as far as possible from each other. As best shown in FIG. 3, it is possible to put secondary transducers LSs1 and LSs2 inside housing 1 as far of possible from each other along the direction of said longitudinal axis 2. As already mentioned with respect to first embodiment, the user will get a maximum stereophonic effect by putting the mobile terminal down on a plane surface so that longitudinal axis 2 is parallel to the plane surface.

In addition, since main frequency band Bm corresponds substantially to the phone frequency band, main transducer LSm can be the transducer classically used in a phone handset as an earphone and/or a hands-free loudspeaker.

FIGS. 5a and 5b illustrate a mobile handset provided with three transducers according to the second embodiment of the invention. For better understanding, the upper half-part of the housing has been removed in order to see the inside part of the housing. FIG. 5a shows main transducer LSm and secondary transducers LSs1 and LSs2 before insertion inside the lower half-part 1' of the housing, while FIG. 5b shows the same components once inserted inside said lower half part. One should note that secondary transducers LSs1 and LSs2 are smaller than main transducer LSm. Accordingly, a good stereophonic effect can be obtained thanks to the invention while keeping in mind the bulk constraint. As can be seen especially from FIG. 5a, it is generally necessary to place main transducer LSm inside an airtight cavity 2 in order to reduce acoustic short-circuits due to a recombination of sound waves originated from both the rear side and the front side of the transducer. However, the acoustic short-circuits phenomena is especially true for low frequencies corresponding to low sounds. Since, according to the invention, the secondary working frequency bands are chosen in the upper part of the frequency spectrum, it is not necessary to make provision of such airtightness for the secondary transducers. Consequently, secondary transducers can be located advantageously at very extreme positions inside the housing.

Transducers used as main transducer and secondary transducers can be of any kind, such as electro-mechanical transducers, or piezo transducers.

In addition to the foregoing features described in relation with FIGS. 1 through 5b, a reinforced stereophonic effect can also be obtained with particular signal processing of the signals provided to the different transducers. FIG. 6 shows a synoptic explaining the signal processing which can be made in the case corresponding to the second embodiment. In this figure, it is assumed that the sound signal which is to be played is a stereo signal represented by its right and left channels R and L. However, it must be understood that a better stereophonic effect is obtained even in case the sound signal is not a stereo signal. Both channels R and L are classically recombined for delivering to main transducer LSm. Between the combination means and main transducer LSm, a low pass filter LPF can be introduced. Each of the right and left channels are also connected to one of said secondary transducers, respectively LSs1 and LSs2, through high pass band filters HPF. The characteristics of the different filters LPF and HPF will depend on the used transducers but also on the environment of each transducer. Accordingly, high pass filters HPF could be different. The signals delivered by said high pass filter can be delivered directly to each secondary transducer LSs1 and LSs2. It is also possible to further increase the stereophonic effect by implementing well-known spatialization algorithms. This is shown on FIG. 6 with reference Spa, consisting in combining on each channel part of the signal taken on the other channel after specific filtering. The above signal processing can also be adapted for a mobile terminal according to the first embodiment.

The invention claimed is:
1. A mobile terminal comprising:
at least three transducers configured to be activated simultaneously as loudspeakers to provide a stereophonic effect, a first one of the transducers being operable to reproduce signals having frequencies within a first working frequency band corresponding to at least the phone frequency band and a second one of the transducers being operable to reproduce signals having frequencies within a second working frequency band different from the first working frequency band, the lowest frequency of the second working frequency band being greater than the lowest frequency of the first working frequency band, and a third one of the transducers having a working frequency band that is substantially identical to the second working frequency band, the highest frequency of the first working frequency band corresponding to the lowest frequency of the working frequency bands of the second and third transducers.

2. The mobile terminal according to claim 1, wherein the first working frequency band overlaps the second working frequency band.

3. The mobile terminal according to claim 2, further comprising a housing extending along a longitudinal axis, the first transducer and the second transducer being located inside the housing spaced apart from each other along the direction of the longitudinal axis at a maximum distance.

4. The mobile terminal according to claim 1, wherein the mobile terminal includes a housing extending along a longitudinal axis, the second and third-transducers being located inside the housing spaced apart from each other along the direction of said longitudinal axis at a maximum distance.

5. The mobile terminal according to claim 1, wherein the phone frequency band corresponds to one of 300 Hz-3400 Hz and 100 Hz-8000 Hz.

6. The mobile terminal according to claim 1, wherein the first transducer is further configured as at least one of an earphone and a hands-free loudspeaker.

7. The mobile terminal according to claim 1, wherein the first transducer and the second transducer are electro-mechanical transducers or piezo transducers.

8. The mobile terminal according to claim 1, further comprising at least one frequency filter configured to filter signals delivered to at least one of the first transducer and the second transducer.

9. The mobile terminal according to claim 1, wherein said mobile terminal further comprises a frequency spatialization unit configured to combine on each separate channel at least part of the different portions of the stereo signal provided on each other separate channel.

10. The mobile terminal according to claim 1, wherein each secondary transducer is configured to receive a different portion of a stereo signal on a separate channel, each different portion of the stereo signal being separately filtered by a frequency filter.

11. A mobile terminal comprising:
at least three transducers configured to be activated simultaneously as loudspeakers to provide a stereophonic effect, a first one of the transducers being operable to reproduce signals having frequencies within a first working frequency band corresponding to at least the phone frequency band and a second one of the transducers being operable to reproduce signals having frequencies within a second working frequency band different from the first working frequency band, the lowest frequency of the second working frequency band being greater than the lowest frequency of the first working frequency band, and a third one of the transducers having a working frequency band that is substantially identical to the second working frequency band, the highest frequency of the first working frequency band corresponding to the lowest frequency of the working frequency bands of the second and third transducers; and
a housing extending along a longitudinal axis, the second and third-transducers being located inside the housing spaced apart from each other along the direction of said longitudinal axis at a maximum distance.

12. The mobile terminal according to claim 11, wherein the first working frequency band overlaps the second working frequency band.

13. The mobile terminal according to claim 12, further comprising a housing extending along a longitudinal axis, the first transducer and the second transducer being located inside the housing spaced apart from each other along the direction of the longitudinal axis at a maximum distance.

14. The mobile terminal according to claim 11, wherein the phone frequency band corresponds to one of 300 Hz-3400 Hz and 100 Hz-8000 Hz.

15. The mobile terminal according to claim 11, wherein the first transducer is further configured as at least one of an earphone and a hands-free loudspeaker.

16. The mobile terminal according to claim 11, wherein the first transducer and the second transducer are electro-mechanical transducers or piezo transducers.

17. The mobile terminal according to claim 11, further comprising at least one frequency filter configured to filter signals delivered to at least one of the first transducer and the second transducer.

18. The mobile terminal according to claim 11, wherein said mobile terminal further comprises a frequency spatialization unit configured to combine on each separate channel at least part of the different portions of the stereo signal provided on each other separate channel.

19. The mobile terminal according to claim 11, wherein each secondary transducer is configured to receive a different portion of a stereo signal on a separate channel, each different portion of the stereo signal being separately filtered by a frequency filter.

* * * * *